United States Patent Office 2,845,380

Patented July 29, 1958

1

2,845,380

EMULSIFIER MIXTURE, METHOD OF PREPARING SAME, AND BIOCIDAL COMPOSITIONS THEREWITH

Raymond L. Mayhew, Phillipsburg, and Leslie G. Nunn, Plainfield, N. J., assignors to General Aniline & Film Corporation, New York, N. Y., a corporation of Delaware No Drawing. Application November 16, 1953
Serial No. 392,508

18 Claims. (Cl. 167—42)

This invention relates to the emulsification of organic biocides and more particularly to the use of a novel combination of surface active agents for such emulsification.

A number of organic biocides have found increasing use as agricultural and/or sanitary chemicals during the past decade. A substantial proportion of such biocides are water-insoluble and are accordingly commonly applied in the form of emulsions in water. Generally, the biocide is dissolved in an organic solvent to form a concentrate and the concentrate is then prepared for use by emulsification in water. In producing such emulsions, the use of various types of surface active agents as emulsifying agents has been proposed. However, in view of the diverse nature of the biocides, addition agents, concentrations and the like, employed in formulating such emulsions, the selection of the proper emulsifying agent in any particular instance is difficult. The selection of the proper emulsifying agent is rendered complex by such factors as compatibilities with the biocide and the solvent, stability of the agent in the organic solvent and/or in water, solubility in the organic solvent, and the like. It is accordingly highly desirable to provide a substantially universal emulsifier useful in organic water-insoluble biocide concentrates which will not be subject to the aforementioned deficiencies.

It is an object of this invention to provide an improved emulsifier which is stable and soluble in organic solvent concentrates of water-insoluble organic biocides. Another object of this invention is the provision of a process for producing such an improved emulsifier. A further object of this invention is the provision of a stable concentrate comprising a solution of a water-insoluble organic biocide and such an improved emulsifier in an organic solvent. Still another object of this invention is the provision of a stable emulsion of the aforementioned concentrate in water. Other objects and advantages will appear as the description proceeds.

The attainment of the above objects is made possible by the instant invention which is based upon the discovery that a mixture comprising from about 95 to 15 parts by weight of a surface active alkyl aryl polyoxyalkylene glycol ether in which the aryl radical is substituted by at least one alkyl radical of at least four carbon atoms and the polyoxyalkylene glycol chain contains from 3 to 7 oxyalkylene groups, and about 5 to 85 parts by weight of a water soluble salt of an inorganic acid ester of one of the above defined polyoxyalkylene glycol ethers constitutes an improved emulsifier soluble and stable in organic solvent concentrates of water-insoluble organic biocides which may then be readily mixed in water to produce stable biocidal emulsions. The said mixture of polyoxyalkylene glycol ether and ester salt has been found superior to either of the two components thereof whereby improved and unexpected results are obtained.

The alkyl aryl polyoxyalkylene glycol ethers operative in the instant invention may be derived in known manner from alkylated aromatic hydroxy compounds of the benzene and naphthalene series such as p-n-butylphenol, amylcresol, diisobutylphenol, diamylphenol, isohexylnaphthol, oleylphenol, isododecylphenol, isooctylresorcinol, nonylphenol, dinonylphenol, isooctylphenol, isooctyl-β-naphthol, isohexylxylenol, n-octadecylphenol, and the like. In general, these alkylated aromatic hydroxy compounds should contain at least one alkyl radical of at least 4 carbon atoms as a ring substituent. It will be understood that such compounds may contain up to 3 alkyl substituents which may be straight or branched, which substituents may contain a total of 20 or more carbon atoms.

These alkylaryl compounds are polyoxyalkylenated by reaction under proper conditions, preferably in the presence of an alkaline catalyst such as potassium hydroxide or sodium hydroxide, and heat and pressure, with from 3 to 7 moles of an alkylene oxide such as ethylene oxide, propylene oxide, or the like, or mixtures thereof.

The water-soluble salt of an inorganic acid ester of the polyoxyalkylene glycol ether employed in the mixture is produced by subjecting the polyoxyalkylene glycol ether to esterification with a strong acid such as chlorosulfonic, sulfamic, sulfuric, or phosphoric or with an inorganic acid anhydride such as sulfur trioxide or phosphorus pentoxide or with acid halides such as sulfuryl chloride, phosphorus oxychloride or phosphorus pentachloride or the like. When a properly substituted acid mixture is employed in the esterification such as aminosulfonic acids, sulfamic acid, ammonium bisulfate, and the like, a water-soluble or dispersible salt is directly produced without the necessity of subsequent neutralization with a basic substance. In such cases, subsequent treatment with basic materials is only for the purpose of neutralizing excess acid, and the like. Excellent results are also obtained when complexes of some of the above acids and anyhydrides are employed. For example, a combination of sulfur trioxide or chlorosulfonic acid with an ether such as dioxane, thioxane or β,β′-dichlorodiethylether, or with a tertiary nitrogen base such as pyridine or triethylamine may be used. The resulting esters may be neutralized with a basic material such as sodium hydroxide, potassium hydroxide, sodium carbonate, sodium acetate, ammonium hydroxide, ammonia, calcium oxide and hydroxide, magnesium oxide and hydroxide, strontium hydroxide, ethanolamine, diethanolamine, triethanolamine, methylamine, dimethylamine, trimethylamine, ethylamine, triethylamine, diethylamine, butylamine, propylamine, cyclohexylamine, morpholine, pyridine, octanolamine, octylamine, and the like.

The alkylaryl polyoxyalkylene glycol ether and acid ester salt are then mixed in the proper proportions to provide mixtures in accordance with this invention. Within the broad range of proportions stated above, mixtures containing about 75 to 25 parts by weight of the polyoxyalkylene glycol ether and 25 to 75 parts by weight of the acid ester salt have been found suitable for most purposes. Mixtures in which the weight ratio of glycol ether to acid ester salt is about 5:3 have been found superior for many purposes.

The components of the mixture made in accordance with this invention and their methods of production, are per se well known, and no claim is made thereto but only to their combination in the manner described. General methods for carrying out the oxyalkylenation reaction to produce the alkylaryl polyoxyalkylene glycol ether, and the esterification and salt formation for producing the corresponding acid ester salt are illustrated in U. S. Patents 1,970,578, 2,167,326, 2,174,761, 2,203,883 and 2,213,477.

It has been found that in some instances the viscous nature of the acid ester salt causes difficulties in mixing with the alkylaryl polyoxyalkylene glycol ether. A further feature of this invention is the provision of a process for directly producing mixtures in accordance with this invention without the necessity of producing the components separately and then mixing them. This may be accomplished by subjecting the alkylaryl polyoxyalkylene glycol ether to esterification with an amount of the requisite acid compound less than molar and in proportions sufficient to produce a mixture of the polyoxyalkylene glycol ether and its corresponding ester or salt thereof in the desired ratio. More specifically, in accordance with this process, one mole of the alkylaryl polyoxyalkylene glycol ether is esterified with about .05 to .85 molecular equivalents of the acid compound. If needed, the acid ester in the mixture is subjected to neutralization as described above. This process can be employed when the polyoxyalkylene glycol ether and the acid ester salt are derived from the same alkylaryl hydroxy compounds. If they are derived from different aromatic hydroxy compounds, it is of course necessary to prepare the polyoxyalkylene glycol ether and ester salt separately.

The above described emulsifier mixtures of the invention may be added in small proportions to organic solvent solutions of water-insoluble organic biocides to produce stable concentrates which emulsify readily when mixed with water to produce stable biocidal emulsions. These emulsions have good stability in waters of varying hardness, creaming very slowly with little or no oil separation and re-emulsifying readily after standing for long periods of time.

The term "biocide" is employed herein and in the appended claims to include insecticides, fungicides, bactericides, herbicides, pest-repellants, and the like. By way of example, the emulsifier mixers of this invention may be employed in producing emulsifiable concentrates containing one or more of the following biocides:

| Trivial or Trade Name | Chemical Name |
|---|---|
| DDT | 2,2-bis(p-chlorophenyl)-1,1,1-trichloroethane. |
| DDD | 2,2-bis(p-chlorophenyl)-1,1-dichloroethane. |
| 2-4-D and esters | 2,4-dichlorophenoxyacetic acid. |
| 2-4-5-T and esters | 2,4,5-trichlorophenoxyacetic acid. |
| Toxaphene | chlorinated camphene (67–69% Cl). |
| Chlordane | contains 60% of 1,2,4,5,6,7,8,8-octachloro-4,7-methano-3a,4,7,7a-tetrahydroindane. |
| Dilan | ⅓ tech.2-nitro-1,1-bis(p-chlorophenyl) propane and ⅔ tech.2-nitro-1,1-bis(p-chlorphenyl) butane. |
| nicotine sulfate | 1-methyl-2-β-pyridyl-pyrrolidine sulfate. |
| Dieldrin | contains 85% of 1,2,3,4,10,10-hexachloro-6,7-epoxy-1,4,4a,5,6,7,8,8a-octahydro-1,4,5,8-dimethanonaphthalene. |
| Lindane | 1,2,3,4,5,6-hexachlorocyclohexane (99% gamma isomer). |
| B. H. C | mixed isomers of 1,2,3,4,5,6-hexachlorocyclohexane. |
| C. P. R | 5.1% piperonyl cyclonene, 0.51% pyrethrum, 2.55% rotenone. |
| I. P. C | isopropyl N-phenyl carbamate. |
| Chloro I. P. C | isopropyl-N-(3-chlorophenyl)carbamate. |
| Methoxychlor | 1,1,1-trichloro-2,2-bis(p-methoxyphenyl)ethane |
| Aldrin | 95% 1,2,3,4,10,10-hexachloro-1,4,4a,5,8,8a-hexahydro-1,4,5,8-dimethanonaphthalene. |
| Parathion | O,O-diethyl-O-p-nitrophenylthiophosphate. |

Suitable organic water-insoluble solvents which may be employed in preparing the biocide concentrate include aliphatic and aromatic hydrocarbons having a carbon content greater than 6, such as kerosene, mineral seal oil, diesel oil, gas oil, mineral oil, xylene, alkylated benzenes, and alkylated naphthalenes. It is understood that compatible alcohols, esters, ketones, etc. which may have a desirable effect may also be employed. Generally, in preparing the concentrate, a highly concentrated solution of the biocide in the organic solvent is prepared containing from about 1 to 25 percent by weight of the emulsifier mixture of this invention.

The emulsifiable concentrates produced in accordance with this invention are readily reduced to application condition by mixing in water. The concentration of the emulsion will of course vary in accordance with the particular biocide, solvent, use contemplated, and the like, but in general from about 0.1 to 20 percent of the concentrate by volume in aqueous emulsion is sufficient for the usual purposes.

The following examples are illustrative of this invention and are not to be regarded as limitative. Parts are by weight unless otherwise indicated. The following emulsifiers were used in the examples:

Emulsifier A contains 5 parts of the reaction product of 1 mole of nonylphenol with 4 moles of ethylene oxide and 3 parts of the ammonium salt of the sulfuric acid ester of the same reaction product.

Emulsifier B contains 5 parts of the reaction product of tetradecylphenol with 5 moles of ethylene oxide and 3 parts of the ammonium salt of the sulfuric acid ester of the same reaction product.

Emulsifier C was prepared by reacting 0.6 mole of chlorosulfonic acid with 1 mole of the reaction product of one mole of nonylphenol with 4 moles of ethylene oxide, and neutralizing the reaction mixture with cyclohexylamine to yield a mixture containing 31.5 percent of the original condensation product and 68.5 percent of the cyclohexylamine salt of the sulfuric acid ester of the same condensation product.

Emulsifier D contains 7 parts of the reaction product of 1 mole of nonylphenol with 3 moles of ethylene oxide and 3 parts of the ammonium salt of the sulfuric acid ester of the same reaction product.

Emulsifier E contains 5 parts of the reaction product of 1 mole of dinonylphenol with 7 moles of ethylene oxide and 3 parts of the ammonium salt of the sulfuric acid ester of the same reaction product.

*Example 1*

An emulsifiable concentrate was prepared containing 18 percent Dieldrin, 74 percent Sovacide 544–C (methylated aromatic petroleum oil, Socony Vacuum Co.) and 8 percent emulsifier A. A mixture of 5.6 cc. of concentrate and 94.4 cc. of water of 300 p. p. m. (parts per million) hardness was emulsified by stirring for one minute with an electric mixer. The concentration of the toxicant in the emulsion was 1.0 percent. The resulting emulsion was stable and showed no creaming after 1 hour. At the end of 24 hours 2.5 cc. of cream had settled on the bottom, but there was no oil separation.

When the above procedure was repeated using, instead of Emulsifier A, 8 percent of the ammonium salt of the sulfate ester of the original reaction product, 5 cc. of cream had settled on the bottom after one hour and 8 cc. of cream after 24 hours.

When the above procedure was repeated using, instead of Emulsifier A, 8 percent of the original reaction product of one mole of nonylphenol with 4 moles of ethylene oxide, 3 cc. of cream and traces of oil separation were evident at the bottom after 1 hour and 60 cc. of cream and considerable oil separation after 24 hours.

When the above procedure was repeated using, instead of Emulsifier A, 8 percent of the reaction product of one mole of nonylphenol with 10 moles of ethylene oxide, 1 cc. of cream appeared at the bottom after 1 hour and 8.5 cc. of cream after 24 hours.

Similarly improved results were displayed when the above procedure was repeated using water of 600 p. p. m. hardness instead of 300 p. p. m. hardness.

*Example 2*

The procedure of Example 1 was repeated except that Hi-Solv Oil No. 473 (methylated aromatic petroleum oil, Pa. Ind.-Chem. Corp.) was employed instead of the Sovacide 544–C. The emulsion containing Emulsifier A showed no creaming after 1 hour and 4 cc. of cream at the top and no oil separation after 24 hours. The emulsion containing as the sole emulsifier the ammonium sulfate ester had 5 cc. of cream at the top after 1 hour and 8 cc. of cream and traces of oil separation at the top after 24 hours. The emulsion containing as the sole emulsifier the original reaction product derived from 4 moles of ethylene oxide had 1 cc. of cream and traces of oil separation at the top after 1 hour and 5 cc. of cream and considerable oil separation after 24 hours. The emulsion containing as the sole emulsifier the reaction product derived from 10 moles of ethylene oxide had 2 cc. of cream at the top after 1 hour and 8 cc. of cream at the top after 23 hours.

*Example 3*

An emulsifiable concentrate was prepared containing 25 percent Parathion, 65 percent xylene and 10 percent Emulsifier A. A mixture of 4 cc. of the concentrate and 96 cc. of 300 p. p. m. water was emulsified by stirring for 1 minute with an electric mixer. The toxicant concentration in the emulsion was 1.0 percent. The resulting emulsion showed no creaming after 1 hour and 5 cc. of cream at the top after 24 hours.

When the above procedure was repeated using instead of Emulsifier A 10 percent of the ammonium sulfate ester of the original reaction product, the emulsion had 3 cc. of cream at the top after 1 hour and 6 cc. of cream at the top after 24 hours.

*Example 4*

The procedure of Example 3 was repeated except that Hi-Solv Oil #473 was employed instead of xylene. The emulsion containing Emulsifier A had no cream after 1 hour and 2 cc. of cream and a trace of oil separation at the top after 24 hours. The emulsion containing as the emulsifier the ammonium sulfate ester of the reaction product derived from 4 moles of ethylene oxide had 3 cc. of cream at the top after 1 hour and 5 cc. of cream and traces of oil separation at the top after 24 hours. The emulsion containing as the emulsifier the original reaction product derived from 4 moles of ethylene oxide creamed immediately, and had 1 cc. of cream and traces of oil separation at the top after 1 hour and 4 cc. of cream and oil separation at the top after 24 hours.

*Example 5*

An emulsifiable concentrate was prepared containing 74 percent chlordane, 20 percent Sovacide 544–C and 6 percent Emulsifier A. A mixture of 3 cc. of the concentrate and 97 cc. of 300 p. p. m. water was emulsified by stirring for 1 minute with an electric mixer. The toxicant concentration in the emulsion was 2.2 percent. The resulting emulsion was originally clear, had 1 cc. of cream on the bottom after 1 hour and 5 cc. of cream and no oil separation on the bottom after 24 hours.

When the above procedure was repeated using instead of Emulsifier A 6 percent of the ammonium sulfate ester of the original reaction product derived from 4 moles of ethylene oxide, 3 cc. of cream appeared on the bottom after 1 hour and 5 cc. of cream appeared at the bottom after 24 hours.

When the above procedure was repeated using instead of Emulsifier A 6 percent of the original reaction product derived from 4 moles of ethylene oxide, there was considerable oil separation at the bottom immediately, and 3 cc. of oil separated at the bottom after 1 hour.

When the above procedure was repeated using instead of Emulsifier A, the reaction product of 1 mole of nonylphenol with 10 moles of ethylene oxide, 3 cc. of cream appeared on the bottom after 1 hour and 5 cc. of cream and traces of oil appeared on the bottom after 24 hours.

*Example 6*

The procedure of Example 5 was repeated except that xylene was employed instead of Sovacide 544–C. The emulsion made with Emulsifier A had 1 cc. of cream on the bottom after 1 hour and 4.5 cc. of cream at the bottom after 24 hours. The emulsion using as the emulsifier the ammonium sulfate ester of the original reaction product derived from 4 moles of ethylene oxide had 4 cc. of cream on the bottom after 1 hour and 5 cc. of cream and traces of oil separation at the bottom after 24 hours. The emulsion using as the emulsifier the original reaction product derived from 4 moles of ethylene oxide creamed immediately, and had 3 cc. of oil separation at the bottom after 1 hour. The emulsion using as the emulsifier the reaction product of nonylphenol with 10 moles of ethylene oxide had 3 cc. of cream at the bottom after 1 hour and 6 cc. of cream and traces of oil on the bottom after 24 hours.

*Example 7*

An emulsifiable concentrate was prepared containing 44 percent 2,4-D isopropyl ester, 51 percent diesel oil and 5 percent Emulsifier A. A mixture of 5 cc. of the concentrate and 95 cc. of 300 p. p. m. water was emulsified by inversion in a graduate 10 times. Toxicant concentration in the emulsion was 2.2 percent. The resulting emulsion had 1 cc. of cream on the top after 1 hour and 5 cc. of cream at the top and no oil separation after 24 hours.

When the above procedure was repeated using instead of Emulsifier A, the ammonium sulfate ester of the original reaction product containing 4 moles of ethylene oxide, 3 cc. of cream and appreciable oil separation appeared at the top after 1 hour and 5 cc. of cream and considerable oil separation appeared at the top after 24 hours.

When the above procedure was repeated using instead of Emulsifier A, 5 percent of the original reaction product derived from 4 moles of ethylene oxide, the emulsion creamed immediately, and had 5 cc. of oil separation at the top after 1 hour.

When the above procedure was repeated using instead of Emulsifier A, 5 percent of the reaction product of nonylphenol with 10 moles of ethylene oxide, 4 cc. of cream and considerable oil separation appeared at the top after 1 hour and 6 cc. of cream and considerable oil separation appeared after 24 hours.

*Example 8*

An emulsifiable concentrate was prepared containing 73 percent of Toxaphene, 21 percent kerosene and 6 percent Emulsifier A. A mixture of 3 cc. of the concentrate and 97 cc. of 300 p. p. m. water was emulsified by stirring with an electric mixer for 1 minute. The toxicant concentration was 2.2 percent. The resulting emulsion had 1 cc. of cream on the bottom after 1 hour and 3.5 cc. of cream and a trace of oil separation on the bottom after 24 hours.

*Example 9*

An emulsifiable concentrate was prepared containing 73 percent Toxaphene, 21 percent xylene, and 6 percent of Emulsifier B. A mixture of 3 cc. of the concentrate and 97 cc. of 300 p. p. m. water was emulsified as in Example 8. There was only a trace of cream after 1 hour and 2.5 cc. of cream and no oil separation after 24 hours.

*Example 10*

An emulsifiable concentrate was prepared containing 25 percent DDT, 72 percent xylene and 3 percent Emulsifier C. A mixture of 20 g. of the concentrate and 80 cc. of 300 p. p. m. water was emulsified by pouring from a graduate through a funnel and into a beaker and back from the beaker through the funnel into the graduate six times, after which the emulsion was transferred into a tumbling machine and tumbled for one minute at 72 R. P. M. A very rich opaque emulsion was obtained which did not show any signs of creaming after standing for 24 hours at room temperature.

*Example 11*

The procedure of Example 10 was repeated except that Emulsifier E was used instead of Emulsifier C and Velsicol AR 50 (methylated aromatic petroleum oil, Velsicol Corp.) instead of xylene. A rich opaque emulsion was formed which showed no signs of cream separation after six hours and only top creaming with no oil separation after 24 hours.

*Example 12*

An emulsifiable concentrate was prepared containing 27.8 percent BHC, 62.2 percent xylene and 10 percent Emulsifier A. A mixture of 5 cc. of the concentrate and 95 cc. of 300 p. p. m. water was emulsified by stirring with an electric mixer for 1 minute. The resulting emulsion showed no creaming after 1 hour and 3 cc. of cream at the bottom and no oil separation after 24 hours.

*Example 13*

An emulsifiable concentrate was prepared containing 27.8 percent BHC, 67.2 percent xylene and 5 percent Emulsifier A. A mixture of 5 cc. of the concentrate and 95 cc. of 300 p. p. m. water was emulsified by stirring for 1 minute with an electric mixer. The emulsion showed no creaming after 1 hour and 3 cc. of cream and no oil separation at the bottom after 24 hours.

*Example 14*

An emulsifiable concentrate was prepared containing 20 percent Lindane, 70 percent Velsicol AR 50 and 10 percent Emulsifier A. A mixture of 5 cc. of the concentrate and 95 cc. of 300 p. p. m. water was emulsified by stirring for 1 minute with an electric mixer. The emulsion showed no creaming after 1 hour and 4 cc. of cream and no oil separation at the bottom after 24 hours.

*Example 15*

An emulsifiable concentrate was prepared containing 20 percent Lindane, 75 percent Velsicol AR 50 and 5 percent Emulsifier A. A mixture of concentrate and 95 cc. of 300 p. p. m. water was emulsified by stirring for 1 minute with an electric mixer. The resulting emulsion had a trace of cream at the bottom after 1 hour and 5.5 cc. of cream at the bottom and no oil separation after 24 hours.

*Example 16*

An emulsifiable concentrate was prepared containing 73 percent Toxaphene, 21 percent xylene and 6 percent Emulsifier A. A mixture of 3 cc. of concentrate and 93 cc. of 300 p. p. m. water was emulsified by stirring for 1 minute with an electric mixer. The resulting emulsion had 1 cc. of cream at the bottom and no oil separation after 1 hour and 4 cc. of cream and no oil separation at the bottom after 24 hours.

*Example 17*

The procedure of Example 16 was repeated except that Sovacide-544-C was used instead of xylene. The resulting emulsion had 2 cc. of cream and traces of oil separation at the bottom after 1 hour and 5 cc. of cream and traces of oil at the bottom after 24 hours.

*Example 18*

The procedure of Example 16 was repeated except that kerosene was used instead of xylene. The resulting emulsion had a trace of cream at the bottom and no oil separation after 1 hour and 4.5 cc. of cream and no oil separation at the bottom after 24 hours.

*Example 19*

The procedure of Example 16 was repeated except that Emulsifier D was used instead of Emulsifier A. The resulting emulsion had a trace of cream at the bottom and no oil separation after 1 hour and 2.5 cc. of cream and no oil separation at the bottom after 24 hours.

*Example 20*

The procedure of Example 18 was repeated except that Emulsifier D was employed instead of Emulsifier A. The resulting emulsion had traces of cream at the bottom and no oil separation after 1 hour and 2.5 cc. of cream and no oil separation at the bottom after 24 hours.

*Example 21*

Charge into a 1-liter 3-necked flask equipped with stirrer, thermometer and powder funnel 396.0 g. (1 mole) of the condensation product of 1 mole of nonylphenol with 4 moles of ethylene oxide and heat to 90° C. Slowly charge into the flask over a 15 minute period (with gradual temperature rise to 120° C.) 31.5 g. (0.3 mole) sulfamic acid. Agitate for one hour at 180° C. after the completion of the addition. Cool with a stream of air on outside of flask until temperature is about 90° C. then add about 2.0 g. monoethanolamine to neutralize to pH 7.5 to 7.1. Stir thoroughly and discharge product preferably while warm. The yield was 427.5 g. of a highly effective and stable emulsifier consisting of about 70% by weight of the condensation product of nonyl phenol with 4 moles of ethylene oxide and 30% of the ammonium salt of the sulfuric acid ester of said condensation product.

It will be understood that one may add to the compositions of this invention stabilizers to avoid decomposition of the biocides or the emulsifier-sulfate constituent e. g. buffers, oxidation inhibitors, acid acceptors, etc. One may also add a corrosion inhibitor to prevent attack of the concentrate or the diluted emulsion on metal containers and equipment.

Various modifications and variations of this invention will be obvious to the person skilled in the art and it is to be understood that such modifications and variations are included within the purview of this application and the spirit and scope of the appended claims.

We claim:

1. An emulsifying mixture comprising about 95 to 15 parts by weight of a surface active alkylaryl polyoxyalkylene glycol ether in which the aryl radical is substituted by from 1 to 3 alkyl radicals, at least one of which contains at least 4 carbon atoms, and the polyoxyalkylene chain contains from 3 to 7 oxyalkylene groups, and about 5 to 85 parts by weight of a water soluble salt of a member of the group consisting of the sulfate and phosphate esters of one of the above defined polyglycol ethers.

2. A mixture as defined in claim 1 wherein the alkyl aryl polyoxyalkylene glycol ether is a nonylphenyl polyoxyethylene glycol ether containing about 4 oxyethylene groups.

3. A mixture as defined in claim 1 wherein the alkylaryl polyoxyalkylene glycol ether is a tetradecylphenylpolyoxyethylene glycol ether containing about 5 oxyethylene groups.

4. A mixture as defined in claim 1 wherein the water soluble salt is a water soluble salt of the sulfuric acid ester of the alkylaryl polyoxyalkylene glycol ether.

5. A process for producing an emulsifying mixture comprising subjecting 1 mole of an alkylaryl polyoxyalkylene glycol ether in which the aryl radical is substitututed by from 1 to 3 alkyl radicals, at least one of which contains at least 4 carbon atoms, and the polyoxyalkylene chain contains from 3 to 7 oxyalkylene groups, to esterification with about 0.05 to 0.85 molecular equivalents of an acid compound selected from the group consisting of sulfating and phosphating agents, and neutralizing the resulting ester with a basic material.

6. A process as defined in claim 5 wherein the acid compound is sulfamic acid.

7. A process as defined in claim 5 wherein the acid compound is chlorosulfonic acid.

8. A process as defined in claim 5 wherein the acid compound is sulfur trioxide.

9. A process as defined in claim 5 wherein the alkylaryl polyoxyalkylene glycol ether is a nonylphenyl polyoxyethylene glycol ether containing about 4 oxyethylene groups.

10. A process as defined in claim 5 wherein the alkyl aryl polyoxyalkylene glycol ether is a tetradecylphenylpolyoxyethylene glycol ether containing about 5 oxyethylene groups.

11. A process as defined in claim 5 wherein the alkylaryl polyoxyalkylene glycol ether is a dinonylphenylpolyoxyethylene glycol ether containing about 7 oxyethylene groups.

12. An emulsifiable concentrate comprising from about 1 to 25 percent by weight of a mixture as defined in claim 1 in a solution of a water-insoluble organic biocide in a water-insoluble organic solvent.

13. A concentrate as defined in claim 12 wherein the solvent is a liquid hydrocarbon containing more than six carbon atoms.

14. An emulsion comprising a concentrate as defined in claim 12 dispersed in water.

15. An emulsion as defined in claim 14 comprising about .01 to 20 percent by volume of the concentrate dispersed in water.

16. A mixture as defined in claim 1 wherein the alkyl aryl polyoxyethylene glycol ether is a dinonylphenylpolyoxyethylene glycol ether containing about 7 oxyethylene groups.

17. A mixture as defined in claim 1 wherein the weight ratio of said polyoxyalkylene glycol ether to water-soluble salt is about 5 to 3.

18. A mixture as defined in claim 1 comprising about 75 to 25 parts by weight of said polyoxyalkylene glycol ether and about 25 to 75 parts by weight of said water-soluble salt.

References Cited in the file of this patent

UNITED STATES PATENTS

| | | |
|---|---|---|
| 2,167,326 | Steindorff et al. | July 25, 1939 |
| 2,203,883 | Steindorff et al. | June 11, 1940 |
| 2,213,477 | Steindorff et al. | Sept. 3, 1940 |
| 2,556,820 | Nease | June 12, 1951 |
| 2,593,112 | Cross et al. | Apr. 15, 1952 |

OTHER REFERENCES

King: Mfg. Chem., September 1941, pp. 211–213 and 217, p. 213 pert.

McCutcheon: Chem. Ind., November 1947, pp. 811–824, pp. 812 and 813 pert.

McCutcheon: Soap and San. Chem., July 1952, pp. 48–57 (pp. 49 and 52 pert).